(12) United States Patent
Zemlicka

(10) Patent No.: US 6,302,493 B2
(45) Date of Patent: Oct. 16, 2001

(54) LIGHTWEIGHT MOTORCYCLE WHEEL

(75) Inventor: Alvin R. Zemlicka, Elkhart Lake, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/736,870

(22) Filed: Dec. 14, 2000

Related U.S. Application Data

(63) Continuation of application No. 09/178,995, filed on Oct. 26, 1998.

(51) Int. Cl.$^7$ .................................................. B60R 1/06
(52) U.S. Cl. .......................................... 301/64.2; 301/65
(58) Field of Search .......................... 301/64.2, 63.1, 301/64.3, 105.1, 95, 96, 97, 65; 295/28

(56) References Cited

U.S. PATENT DOCUMENTS

| | | | |
|---|---|---|---|
| 6,021 | * | 1/1849 | Treadwell ........................ 295/28 |
| 6,415 | * | 5/1849 | Kuran ............................. 295/28 |
| 7,658 | * | 9/1850 | Severson ......................... 295/28 |
| 7,710 | * | 10/1850 | Washburn ........................ 295/28 |
| 8,106 | * | 5/1851 | Hebbard .......................... 295/28 |
| 10,184 | * | 11/1853 | Farnsworth ...................... 295/28 |
| 85,745 | * | 1/1869 | Lobdell .......................... 295/28 |
| D. 171,011 | | 12/1953 | Rosenberg . |
| 1,365,637 | * | 1/1921 | MacBeth ......................... 301/64.1 |
| 1,468,085 | * | 9/1923 | Schenck et al. .................. 301/65 |
| 1,492,416 | | 4/1924 | Beeman . |
| 1,728,641 | * | 9/1929 | Trant et al. ...................... 295/28 |
| 2,110,126 | | 3/1938 | Gannett . |
| 2,187,777 | | 1/1940 | Gannett . |
| 2,367,825 | | 1/1945 | Shaw . |
| 2,427,430 | | 9/1947 | Waldeck et al. . |
| 2,643,917 | | 6/1953 | Douglas et al. . |
| 2,692,801 | | 10/1954 | Rosenberg . |
| 2,818,302 | | 12/1957 | Black, Jr. . |
| 4,580,846 | | 4/1986 | Johnson et al. . |
| 4,822,111 | | 4/1989 | Albert . |

OTHER PUBLICATIONS

1994 Uniquely V–Twin Manufacturing catalog—p. 491.
1994 Custom Chrome Catalog—pp. 528, 531, and 532.
1995 Genuine Parts & Accessories, Harley–Davidson, Inc.—p. 108.

* cited by examiner

*Primary Examiner*—S. Joseph Morano
*Assistant Examiner*—Long Bao Nguyen
(74) *Attorney, Agent, or Firm*—Michael Best & Friedrich LLP

(57) ABSTRACT

A motorcycle wheel includes a rim portion, a hub portion, a joining portion extending between the hub portion and the rim portion, and an axle housing portion. The joining portion includes first and second sidewalls defining outwardly-facing continuous concave surfaces. The first and second sidewalls define a well adjacent the rim portion. The first and second sidewalls contact each other at a merger portion intermediate the hub portion and the rim portion. The first sidewall is slightly thicker than said second sidewall to facilitate casting the wheel as one piece. A merger point in the merger portion has a thickness that is less than the minimum thicknesses of a portion of the first and second walls between the hub portion and the merger portion. The hub portion includes apertures to reduce the weight of the wheel. The axle housing portion protects a motorcycle axle from debris passing through the apertures in the hub portion, and stiffens the axle bearing supports.

9 Claims, 3 Drawing Sheets

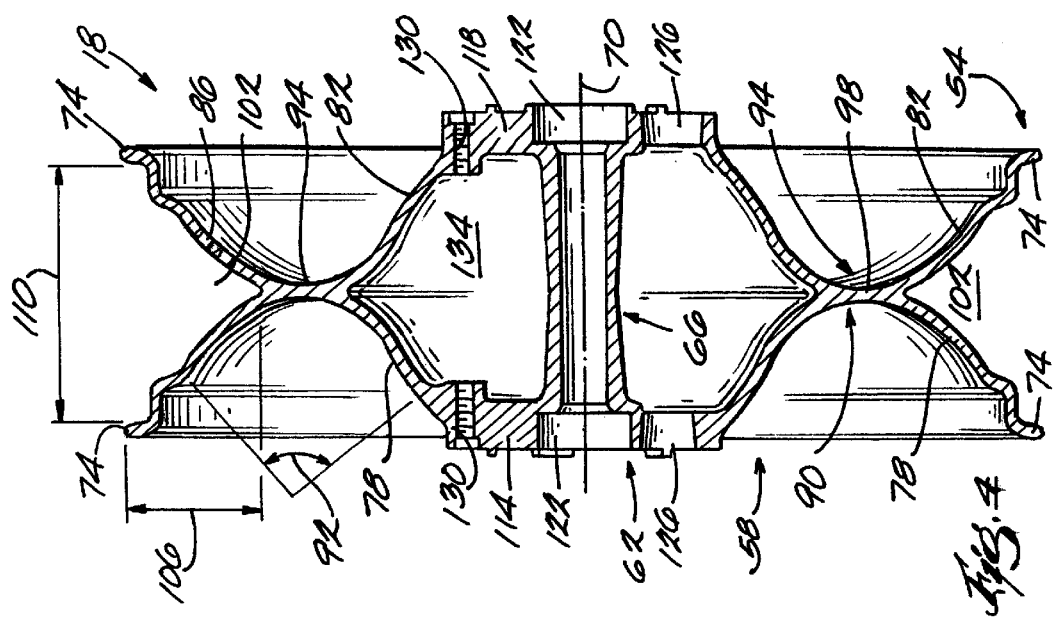
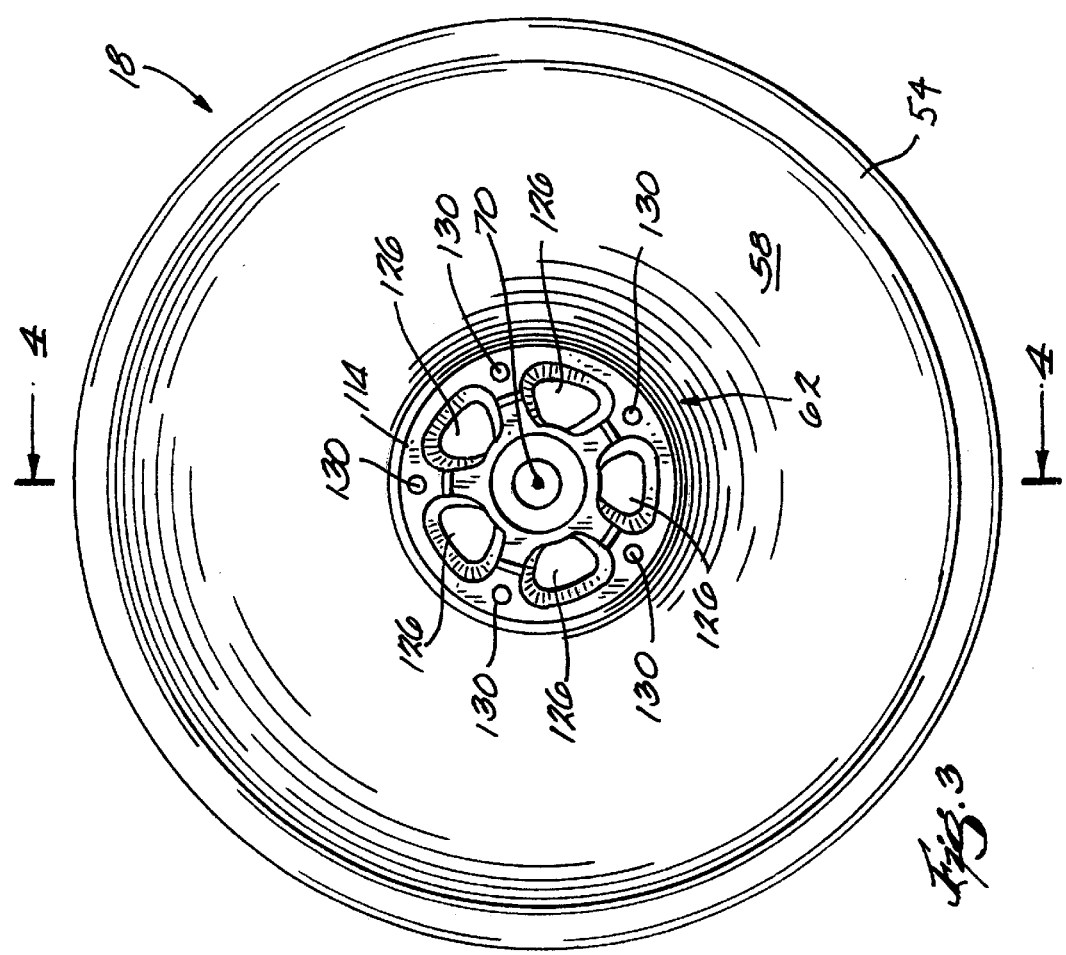

LIGHTWEIGHT MOTORCYCLE WHEEL

This application is a continuation of U.S. application Ser. No. 09/178,995 filed on Oct. 26, 1998, the entire contents of which are incorporated herein by reference.

FIELD OF THE INVENTION

The invention relates to motorcycle wheels.

BACKGROUND

Motorcycle wheels support the weight of a motorcycle. Bumps and potholes over which the motorcycle is ridden cause stress on the motorcycle wheels, and the wheels typically absorb a portion of such stress. If a wheel fails under such stress, the motorcycle may be rendered inoperable. It is therefore critical that the wheel be made sturdy enough to absorb the stresses encountered during the operation of a motorcycle.

In an effort to prevent wheel failure, prior art wheels are constructed to be relatively heavy. A benefit of a heavier wheel is the potential for better tolerance for stress. A disadvantage of such heavy construction is added weight, resulting in diminished handling and reduced fuel efficiency for the motorcycle.

SUMMARY OF THE INVENTION

The present invention provides a motorcycle wheel of relatively light weight. The motorcycle wheel of the present invention comprises a rim portion, a joining portion, a hub portion, and an axle housing portion. The rim portion includes a tire-receiving portion that is adapted to receive a standard motorcycle tire.

The joining portion extends between the rim portion and the hub portion. In one aspect of the invention, the joining portion includes a first relatively thick sidewall, and a second relatively thin sidewall.

In another aspect of the invention, the wheel is cast as one piece, with each sidewall defining a smooth and continuous outwardly-facing concave surface. The curved shape of the sidewalls allows a structurally strong wheel to be manufactured with less material. The extra thickness of the first sidewall allows one-piece casting while avoiding a chill effect when the wheel is cast.

In another aspect of the invention, the first and second sidewalls contact each other between the rim portion and the hub portion at a merger portion, and diverge from one another toward the rim portion and the hub portion. The merger portion has a minimum thickness approximately equal to the thickness of the first sidewall. The merger of the sidewalls provides extra stability to the wheel while requiring less material and further reducing the weight of the wheel.

In yet another aspect of the invention, the first and second sidewalls define a radially outwardly-facing well adjacent the rim portion. The ratio of the maximum depth of the well to the maximum width of the well is relatively large compared to prior art wheels, further reducing the required material and weight of the wheel.

The hub portion includes spaced-apart generally cylindrical first and second hubs that are substantially centrally located or co-axial with respect to the rim portion. The first and second hubs define apertures to further reduce the weight of the wheel. The axle housing portion extends between the first and second hubs and defines a bore that is sized to house a motorcycle axle. The axle housing serves to protect the motorcycle axle from debris that passes through the apertures in the first and second hubs, and to stiffen the bearing supports for the axle bearings.

BRIEF DESCRIPTION OF THE DRAWINGS

FIG. 3 is a side elevational view of the wheel of FIG. 1.

FIG. 4 is a section view of the wheel taken along line 4—4 in FIG. 3.

DETAILED DESCRIPTION

Figure 1:
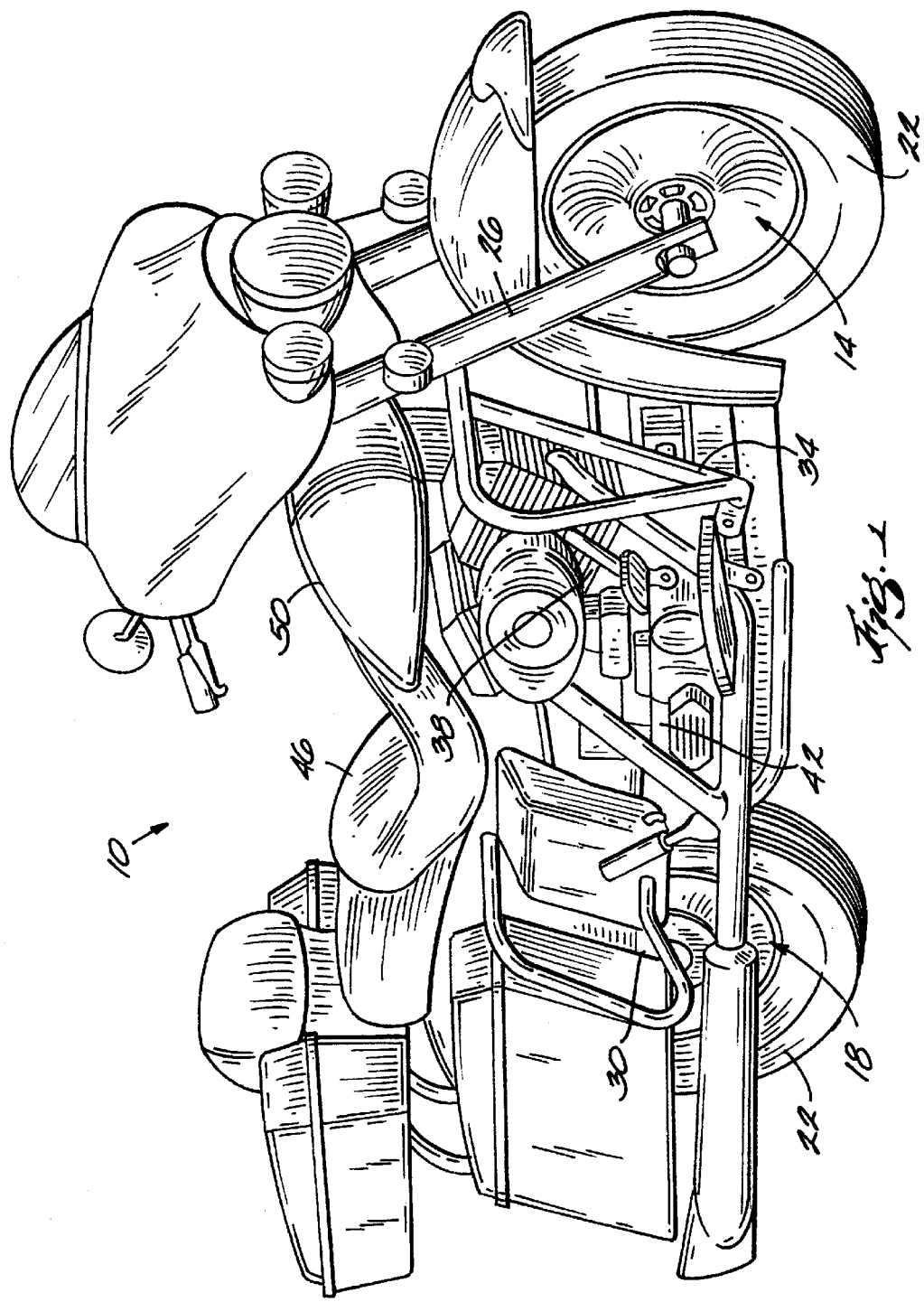
FIG. 1 is a perspective view of a motorcycle incorporating a motorcycle wheel embodying the present invention.

FIG. 1 illustrates a motorcycle 10 having front and rear wheels 14, 18. Mounted on each of the front and rear wheels 14, 18 is a tire 22. A front suspension 26 and a rear suspension 30 are respectively attached to the front and rear wheels 14, 18. The front and rear suspensions 26, 30 support a motorcycle frame 34 on which are mounted an engine 38, a transmission 42, a seat 46, and a fuel tank 50.

Figure 2:
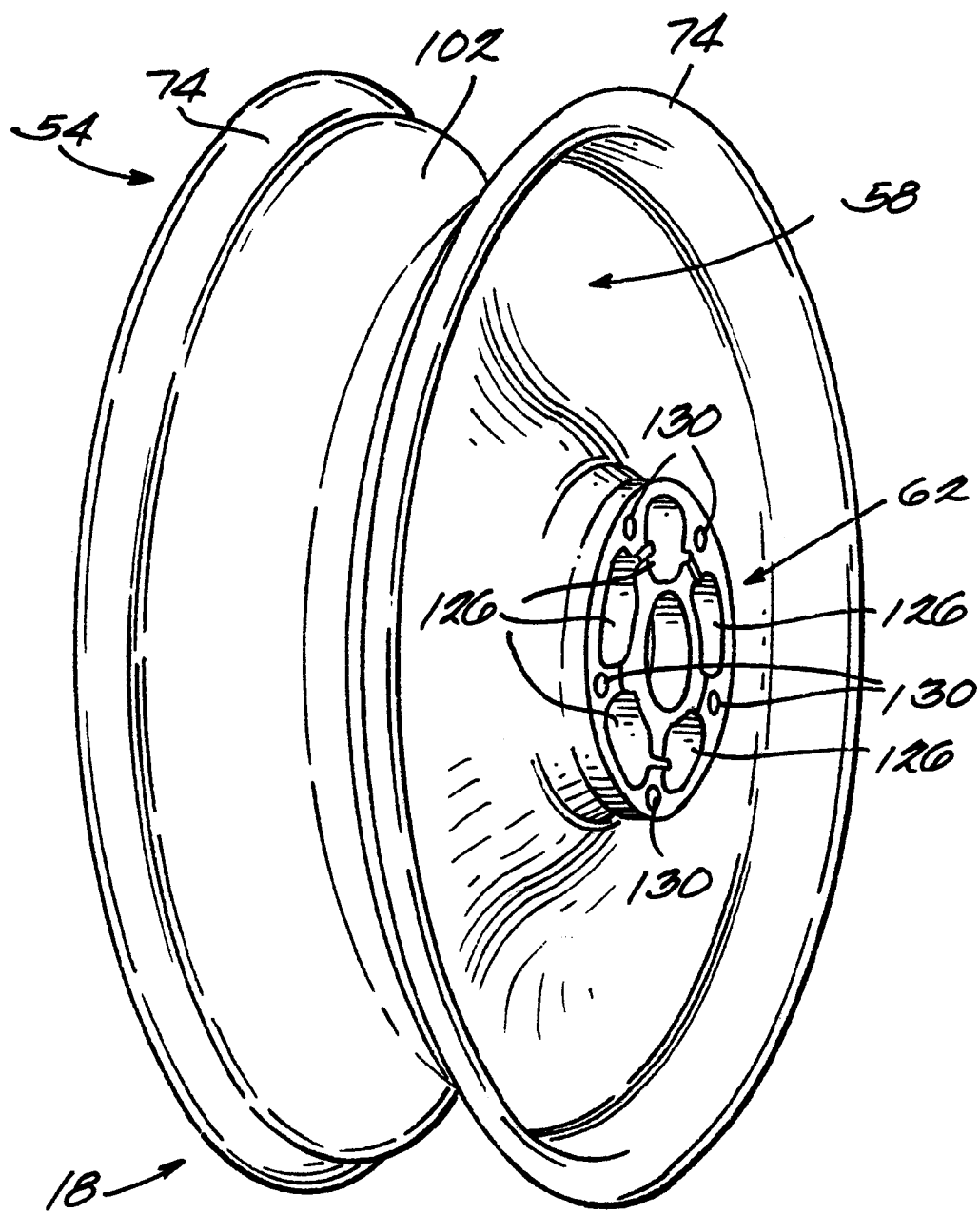
FIG. 2 is a perspective view of the wheel of FIG. 1.

Referring now to FIGS. 2–4, in which the rear wheel 18 is shown, the wheel 18 includes a rim portion 54, a joining portion 58, a hub portion 62, and an axle housing portion 66. The wheel 18 defines a central axis 70 (FIG. 4) about which the wheel 18 rotates during normal operation.

The rim portion 54 is adapted to receive a standard motorcycle tire, and is generally co-axial with the central axis 70. In the illustrated embodiment, the rim portion 54 includes two separate tire-receiving portions 74.

In the illustrated embodiment, the joining portion 58 includes a first sidewall 78 and a second sidewall 82 (FIG. 4). The first and second sidewalls 78, 82 each define a generally smooth, concave, and continuous or unbroken outwardly-facing surface, except for a valve stem aperture 86 in the second side wall 82, joining the rim portion 54 to the hub portion 62. The continuous concave surfaces provide superior distribution of stress, and allows the first and second sidewalls 78, 82 to be made relatively thin. The radius of curvature 90 for each of the concave surfaces is at least 30 mm, preferably at least 40 mm, and most preferably at least 50 mm. In the illustrated embodiment, the radius of curvature is about 52 mm. The concave surface for each of the first and second sidewalls 78, 82 defines an arc length 92. The arc length 92 of the illustrated embodiment is about 1240, but could be about as low as 1100 or 900.

The first and second sidewalls 78, 82 contact each other at a merger portion 94 to form a single wall. The merger portion 94 is generally hourglass shaped, having a central merger point 98 disposed approximately halfway between the rim portion 54 and the hub portion 62. The illustrated merger portion 94 has a thickness ranging from about 18 mm at the top and bottom, to about 5 mm at the merger point 98. The sidewalls 78, 82 diverge from each other from the merger portion 94 toward the rim portion 54 and toward the hub portion 62.

The first and second sidewalls 78, 82 have approximately the same minimum thickness (about 4 mm in the illustrated embodiment) between the merger portion 94 and the rim portion 54. Between the merger portion 94 and the hub portion 62, however, the minimum thickness of the first sidewall 78 is thicker than the minimum thickness of the second sidewall 82 (the illustrated first sidewall 78 having a minimum thickness of about 7 mm and the illustrated second sidewall 82 having a minimum thickness of about 5 mm). The first sidewall 78 is relatively thick between the merger portion 94 and the hub portion 62 to facilitate casting the wheel 18 as one piece. Molten metal that is poured or injected into a mold cools as it fills the cavities of the mold. This is commonly referred to as "chill." The illustrated wheel 18 is cast by pouring or injecting molten metal into a mold from the side of the wheel 18 having the first sidewall 78. The slightly thicker cavity in the mold corresponding to the portion of the first sidewall 78 extending between the merger portion 94 and the hub portion 62 allows some of the molten iron to solidify in the mold without blocking the metal flowing into the cavities in the mold corresponding to the rest of the wheel 18.

The first and second sidewalls 78, 82 and the rim portion 54 collectively define a radially outwardly-facing well 102 adjacent the rim portion 54 of the wheel 18. The illustrated well 102 includes a depth 106 of about 74 mm and a width 110 of about 140 mm. Preferably, the depth 106 is at least 40 mm and the width 110 is at least about 100 mm. The depth-to-width ratio is at least about 0.3, and is preferably at least about 0.4, and ideally at least about 0.5. This relatively large depth-to-width ratio further lightens the wheel 18 because it removes material that exists adjacent the rim portion 54 in prior art wheels.

In the illustrated embodiment, the hub portion 62 includes a first side hub 114 and a second side hub 118. The first and second side hubs 114, 118 are generally cylindrical in shape, and have longitudinal axes that are substantially co-axial with the central axis 70. The first side hub 114 is adapted to support a drive sprocket (not shown) for the motorcycle 10, and is therefore made thicker. The illustrated first side hub 114 is about 26 mm thick while the illustrated second side hub 118 is about 22 mm thick. The first and second side hubs 114, 118 include bearing supports 122 for receiving and supporting wheel bearings (not shown).

Each of the first and second side hubs 114, 118 define apertures 126 therethrough to reduce the weight of the wheel 18. In the illustrated embodiment, each hub 114, 118 farther defines five threaded orifices 130 that are evenly spaced from and around the central axis 70 to facilitate mounting a drive sprocket (not shown) or brake rotor (not shown). The first sidewall 78, second sidewall 82, first hub 114, and second hub 118 define a cavity 134 therebetween. The cavity 134 is in fluid flow communication with the atmosphere through the apertures 126.

The axle housing portion 66 extends between the first and second hubs 114, 118 within the cavity 134, and defines a bore therethrough that is sized to house a motorcycle axle (not shown). The axle housing portion 66 is substantially continuous around the axle and between the first and second hubs 114, 118, and serves to protect the motorcycle axle from debris that passes through the apertures 126 in the first and second side hubs 114, 118. The bore is therefore not in direct fluid flow communication with the cavity 134, and the axle housing portion 66 is disposed between the axle and the cavity 134. The axle housing portion 66 also serves as a brace between the side hubs 114, 118 to stiffen the bearing supports 122. The stiffness of the axle housing portion 66 maintains the bearing supports 122 and axle in the proper orientation with respect to each other for optimal bearing performance and longevity.

Although particular embodiments of the present invention have been shown and described, other alternative embodiments will be apparent to those skilled in the art and are within the intended scope of the present invention. Thus, the present invention is to be limited only by the following claims.

What is claimed is:

1. A motorcycle wheel comprising:
a rim portion adapted to receive a motorcycle tire;
a hub portion adapted to receive and support a motorcycle axle; and
a joining portion extending between said rim portion and said hub portion, said joining portion including at least one sidewall defining an outwardly-facing concave surface that is substantially smooth and that has a substantially constant and continuous radius of curvature between said rim portion and said hub portion, which radius of curvature continues for at least 90°.

2. The motorcycle wheel of claim 1, wherein said at least one sidewall includes first and second sidewalls defining first and second oppositely-facing concave surfaces.

3. The motorcycle wheel of claim 1, wherein said outwardly-facing smooth concave surface includes a curved portion having a radius of curvature of at least about 30 mm.

4. The motorcycle wheel of claim 3, wherein said curved portion radius is at least about 40 mm.

5. The motorcycle wheel of claim 3, wherein said curved portion radius continues for at least 110°.

6. The motorcycle wheel of claim 1, wherein said at least one sidewall includes first and second sidewalls, and wherein said first and second sidewalls merge to form a single wall at a merger portion between said rim portion and said hub portion, said first and second sidewalls diverging from said merger portion toward said rim portion and toward said hub portion.

7. The motorcycle wheel of claim 6, wherein said merger portion includes a merger point positioned approximately halfway between said rim portion and said hub portion.

8. The motorcycle wheel of claim 1, further comprising a central axis, said hub portion defining at least one aperture that is spaced from said central axis.

9. A one-piece cast motorcycle wheel comprising:
a rim portion;
a hub portion including first and second spaced side hubs; and
a joining portion extending between said rim portion and said hub portion, said joining portion including a first sidewall extending from said first side hub and a second sidewall extending from said second side hub, said first and second sidewalls merging at a merger portion to form a single wall disposed intermediate said rim portion and said hub portion, the minimum thickness of said single wall at said merger portion being less than the minimum thickness of a portion of each of said first and second sidewalls between said merger portion and said hub portion, wherein said first and second sidewalls diverge from said merger portion to said rim portion.

* * * * *